United States Patent [19]

Fujita

[11] Patent Number: 4,756,503
[45] Date of Patent: Jul. 12, 1988

[54] SLIDE DEVICE FOR AN AUTOMOTIVE SEAT

[75] Inventor: Yasuyuki Fujita, Akishima, Japan

[73] Assignee: Tachi-S Co. Ltd., Akishima, Japan

[21] Appl. No.: 927,357

[22] Filed: Nov. 4, 1986

[51] Int. Cl.⁴ ............................................. F16M 13/00
[52] U.S. Cl. .................................. 248/430; 296/65 R;
     297/346; 297/473; 384/34; 384/42
[58] Field of Search ............... 248/430, 419, 420, 424,
     248/425, 429; 384/10, 18, 19, 47, 42, 37, 38, 34;
     297/344, 346, 473; 296/65 R, 63

[56] References Cited

U.S. PATENT DOCUMENTS

| | | | |
|---|---|---|---|
| 3,889,913 | 6/1975 | Adams | 248/430 |
| 4,516,811 | 5/1985 | Akiyama et al. | 384/34 |
| 4,556,186 | 12/1985 | Langmesser, Jr. et al. | 384/34 X |
| 4,564,236 | 1/1986 | Kluting et al. | 297/344 |
| 4,629,254 | 12/1986 | Stulper et al. | 248/430 X |

FOREIGN PATENT DOCUMENTS

| | | | |
|---|---|---|---|
| 737270 | 6/1966 | Canada | 248/430 |
| 2702576 | 7/1978 | Fed. Rep. of Germany | 248/430 |
| 2715640 | 10/1978 | Fed. Rep. of Germany | 248/430 |
| 2806795 | 8/1979 | Fed. Rep. of Germany | 248/430 |

Primary Examiner—David L. Talbott
Attorney, Agent, or Firm—Oldham, Oldham & Weber Co.

[57] ABSTRACT

A slide device for use in an automotive seat which is capable of adjusting the positions of the seat forwardly and backwardly. In the slide device, an upper rail provided on the side of the seat is slidably mounted via a slider to a lower rail provided on the side of floor of the automobile. The slider comprises a plate spring which is provided with a plurality of projected portions in the portions thereof where the slider is brought into contact with the upper rail. That is, the projected portions of the plate spring prevents the generation of play of the upper rail in the vertical direction as well as in the right and left direction thereof.

7 Claims, 3 Drawing Sheets

FIG. 1 PRIOR ART
FIG. 2
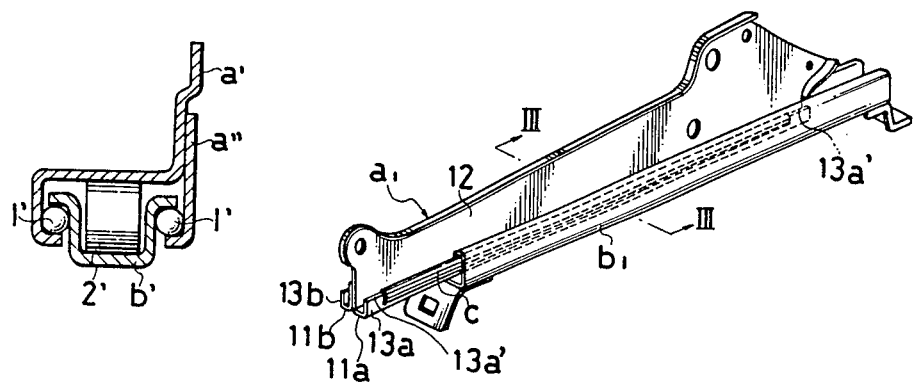
FIG. 3
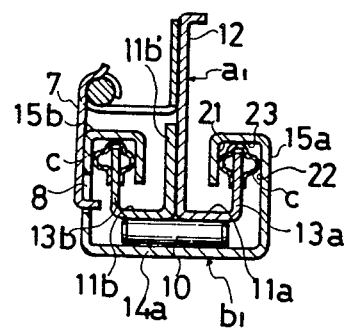
FIG. 4
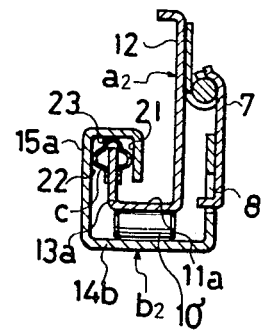

SLIDE DEVICE FOR AN AUTOMOTIVE SEAT

BACKGROUND OF THE INVENTION

1. Field of the Invention

The present invention relates to a slide device for mounting a seat to the floor surface of an automobile in such a manner that the seat can be adjusted in position in the longitudinal direction of the automobile.

2. Description of the Prior Art

In FIG. 1, there is illustrated a conventional slide device of this kind. In FIG. 1, reference characters (a')(a'') respectively designate upper rails and (b') represents a lower rail. Between the upper rails (a')(a'') and lower rail (b'), there are interposed balls (1')(1') and a roller (2'). These upper rails (a')(a'') are slidable on the lower rail (b') through the balls (1')(1') and roller (2'). The two balls (1')(1') are used to adjust the play of the upper rails (a')(a'') in the right and left directions thereof, while the roller (2') is used to adjust the play of the upper rails (a')(a'') in the vertical direction thereof.

However, in the above-mentioned conventional slide device, when the above-mentioned upper rails (a')(a'') and lower rail (b') are formed of metal plates by press working or similar means, they cannot be formed into predetermined dimensions since the material lots thereof vary in size. For this reason, in order to improve the slide performance or the slidability of the upper rails (a')(a''), slider means such as the above-mentioned balls and roller must be selectively used according cases.

Also, even after the slide device is assembled, the upper rails (a')(a'') must be re-adjusted in the slidability thereof before it can be supplied as a complete product. In other words, the above-mentioned prior art slide device requires much time and labor for control of its slidability in assembly as well as after assembly, and thus it is disadvantageous in that it cannot be supplied at an inexpensive cost.

SUMMARY OF THE INVENTION

The present invention aims at eliminating the drawbacks found in the above-mentioned conventional slide device.

Accordingly, it is an object of the invention to provide an improved slide device which eliminates the need for adjustment of a slider in assembly as well as for re-adjustment of the slider after assembly even when upper and lower rails vary in size.

In order to attain the above object, according to the invention, there is employed a plate spring as the slider and the plate spring is provided with projected portions to prevent the upper rails from producing play in the vertical as well as right and left directions thereof. Therefore, in order that the plate spring can perform its function to the full, the plate spring is mounted to the upper rail through an upstanding side plate of the upper rail and the projected portions of the plate spring can be resiliently brought into contact with the ceiling portion and right and left inner wall portions of a U-shaped engagement section of the lower rail into which the upper rail side plate is inserted.

In other words, in the present invention, since the use of the plate spring as the slider can absorb variations or differences between the upper and lower rails in the right and left direction as well as the vertical direction thereof, there is eliminated the disadvantage found in the above-mentioned prior art slide device.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 1 is a section view of a conventional slide device;

FIG. 2 is a perspective view of an embodiment of a slide device constructed in accordance with the present invention;

FIG. 3 is a section view taken along the line III—III in FIG. 2;

FIG. 4 is a section view of another embodiment of a slide device according to the invention;

DETAILED DESCRIPTION OF PREFERRED EMBODIMENTS OF THE INVENTION

Figure 5:
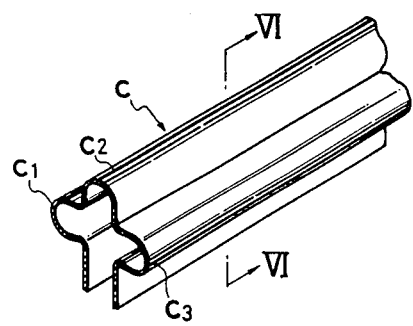
FIG. 5 is a perspective view of a slider employed in the invention.

Referring first to FIG. 2, there is shown a perspective view of a slide device for use in an automotive seat constructed in accordance with the present invention. In this figure, reference characters (a1) designates the upper rail, (b1) represents the lower rail, and (c) stands for a slider formed of a plate spring, which slider has two ends secured to the upper rail (a) so as to prevent the slider from slipping off from the upper rail (a).

Figure 9:
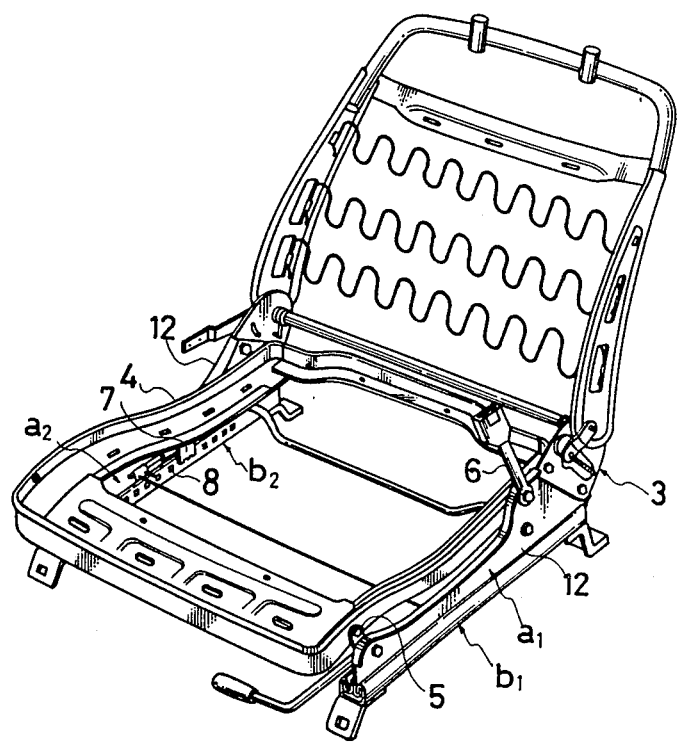
FIG. 9 is a perspective view of a frame structure of an automotive seat incorporating the slide device of the invention.

The illustrated upper rails (a1)(a2), as shown in FIG. 9, are adapted to be able to fasten a reclining device (3) thereto and are also formed integrally with a belt-shaped mounting portion (12) for mounting a lifter (5) which is used to move a seat cushion frame (4) upwardly or downwardly. Due to the fact that there is fixed an anchor (6) of a seat belt to the mounting portion (12) of the upper rail (a1), the upper rail mounting portion (12) must be able to endure loads which are applied by the seat belt and act on the mounting portion to remove it from the upper rail. For this purpose, the mounting portion (12) is provided in the lower two sides thereof with plate-shaped side portions (13a)(13b) by means of bottom portions (11a)(11b), so that the two side portions (13a)(13b) can be brought into engagement with the lower rail (b1).

The bottom portions (11a)(11b) of the upper rail are formed integrally with the side portions (13a)(13b) thereof and one bottom portion (11a) is formed integrally with the mounting portion (12), while the other bottom portion (11b) is fixed to the mounting portion (12) by means of a fixing portion (11b').

The side portions (13a)(13b) are respectively formed so as to stand upright by folding at right angles with respect to the horizontally extending bottom portions (11a)(11b), and each of the side portions (13a)(13b), for example, the side portion (13a) is provided at the upper two ends in the longitudinal direction thereof with projected portions (13a')(13a'), so that the slider (c) attached to the side portions (13a)(13b) is prevented from slipping off out of position. In the drawings, reference numeral (10) designates a roller which is formed of metal.

The other upper rail (a2) disposed opposite to the above-mentioned upper rail (a1) is constructed as shown in FIG. 4. That is, the mounting portion (12), bottom portion (11a) and side portion (13a) which form the upper rail (a1) are formed into an integral body by means of a metal plate.

The lower rails (b1)(b2) respectively comprise horizontally extending support portions (14a)(14b) which are respectively disposed below the bottom portions (11a)(11b) of the above-mentioned upper rails (a1)(a2), and engagement portions (15a)(15b) respectively having a U-shaped section and extending integrally with and from the longitudinal edges of the support portions (14a)(14b), into which engagement portions (15a)(15b) the side portions (13a)(13b) of the above-mentioned upper rails (a1)(a2) are to be inserted. And, the above-mentioned sliders (c) are respectively interposed between the engagement portions (15a)(15b) and the side portions (13a)(13b).

Figure 7:
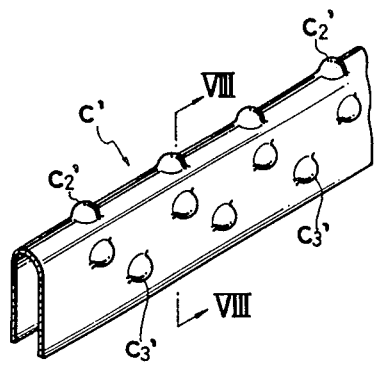
FIG. 7 is a perspective view of another embodiment of a slider employed in the invention.
Figure 8:
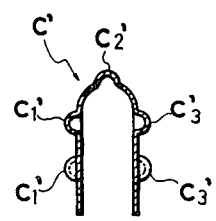
FIG. 8 is a section view taken along the line VIII—VIII.

In the drawings, reference numeral (7) designates a stopper which can be engaged with an engagement hole (8) formed in the respective lower rails (b1)(b2) so as to restrict the sliding motions of the upper rails (a1)(a2). The slider (c), as shown in FIG. 5, is a plate spring provided with expansionshaped projections (c1)(c2)(c3) which can be brought into resilient contact with the right and left inner walls (21)(22) of the engagement portions (15a)(15b) and the ceiling portion (23) thereof. The illustrated projection (c1) - - - are respectively formed in substantially trough shapes so as to extend along the longitudinal direction of the slider (c). However, the projection may be formed in other shapes so long as they are convex. For example, a plurality of independent and spaced projections may be provided in the longitudinal direction of the slider (c). Or, instead of the projections (c1)(c2)(c3), there can be provided a large number of small projections (C1')(C2')(C3') - - - in the vertical direction of the slider (c), as shown in FIGS. 7 and 8.

Figure 6:
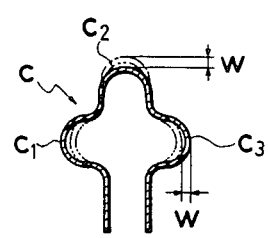
FIG. 6 is an explanatory view to illustrate how the above slider is deformed.

Therefore, the slider (c) can be deformed in such a manner as shown in FIG. 6 due to the projections (c1)(c2)(c3) or (C1')(C2')(C3') - - - and is also able to prevent the generation of plays between the upper and lower rails thanks to its elastic forces (w1)(w2).

As has been discussed hereinbefore, according to the invention, since the elastic forces of the slider formed of a plate spring and interposed between the upper and lower rails are able to absorb the play of the upper rail relative to the associated lower rail, even when the forming materials of the upper and lower rails vary in quality and in size, there is eliminated the need to select and assemble suitable sliders as in the above-mentioned conventional slide device, and there is also eliminated the need to adjust the slider for improvement of the slidability of the upper rail after assembly. As a result of this, the respective components of the present slide device are enhanced in productivity as well as the number of man-hour can be reduced. In other words, the invention can provide an improved slide device which is inexpensive and is improved in slidability.

What is claimed is:

1. A slide device for use in an automotive seat comprising:
    an upper rail including two belt-shaped bottom portions, a mounting portion extending upward from one of the longitudinal-direction edges of one of said bottom portions, and two side portions respectively extending upward substantially at right angles from the opposite edges of said two bottom portions, and in the longitudinal direction thereof, said mounting portion being disposed in said bottom portion, between said side portions;
    a lower rail including a support portion respectively located below said two bottom portions of said upper rail, and two engagement portions of a substantially U-shaped section into which said side portions of said upper rail, which extend vertically upward at right angles from opposite edges of said bottom portion, are respectively inserted from the first longitudinal-direction edges of said support portion; and,
    a pair of sliders each interposed between said engagement portion of said lower rail and said side portion of said upper rail, characterized in that each of said sliders is formed of a plate spring provided with a plurality of resilient projected portions which are disposed at positions corresponding to the right, left, and top portions of each of said side portions of said upper rail such that they are expanded out in the direction of each of said engagement interfaces with said lower rail.

2. A slide device for use in an automotive seat as set forth in claim 1, wherein there is provided a roller between said bottom portions of said upper rail and said lower rail, and wherein a reclining device and a lifter for moving up and down a seat cushion frame are mounted to said mounting portion of said upper rail.

3. A slide device for use in an automotive seat as set forth in claim 1, wherein an anchor of a seat belt is fixed to the mounting portion of said upper rail.

4. A slide device for use in an automotive seat as set forth in claim 1, wherein said bottom portions, mounting portions and side portions of said upper rail are formed of the same material.

5. A slide device for use in an automotive seat as set forth in claim 1, wherein said side portions of said upper rail each is provided at the two longitudinal ends thereof with projected portions formed integrally with said side portions to prevent said slider to be mounted to its associated upper rail side portion from slipping off out of position.

6. A slide device for use in an automotive seat as set forth in claim 1, wherein said projected portions provided in said sliders are projections which are independent of one another.

7. A slide device for use in an automotive seat as set forth in claim 1, wherein said projected portions provided in said sliders are formed in a semi-cylindrical shape which is longer in the longitudinal direction of said slider.

* * * * *